United States Patent [19]

Allocco, Jr. et al.

[11] Patent Number: 4,660,819
[45] Date of Patent: Apr. 28, 1987

[54] AUTOMATIC RESTACKING REGISTRATION IN A RECIRCULATING DOCUMENT HANDLER

[75] Inventors: Carmen Allocco, Jr., Pittsford; William R. Burger, Fairport, both of N.Y.

[73] Assignee: Xerox Corporation, Stamford, Conn.

[21] Appl. No.: 654,702

[22] Filed: Sep. 27, 1984

[51] Int. Cl.$^4$ .............................................. B65H 1/06
[52] U.S. Cl. .................................... 271/3.1; 271/161; 271/171; 271/209; 271/223
[58] Field of Search ................... 271/3.1, 35, 94, 161, 271/209, 171, 223

[56] References Cited

U.S. PATENT DOCUMENTS

| | | | |
|---|---|---|---|
| 3,198,515 | 8/1965 | Pitney | 271/26 |
| 3,336,026 | 8/1967 | Preuss | 271/14 |
| 3,624,807 | 11/1971 | Schwebel | 271/74 |
| 3,645,526 | 2/1972 | Holecek et al. | 271/32 |
| 3,877,695 | 4/1975 | Carroll | 271/18 |
| 3,918,706 | 11/1975 | Craft | 271/250 |
| 3,921,972 | 11/1975 | Miller | 271/171 |
| 4,005,794 | 2/1977 | Lundquist | 271/161 |
| 4,162,067 | 7/1979 | Horak et al. | 271/177 |
| 4,171,131 | 10/1979 | Stange et al. | 271/236 |
| 4,219,191 | 8/1980 | Rastorguyeff | 271/171 X |
| 4,313,669 | 2/1982 | Larson | 271/209 X |
| 4,336,929 | 6/1982 | Hanzlik | 271/35 X |
| 4,349,186 | 9/1982 | Nakamura | 271/161 X |
| 4,381,893 | 5/1983 | Silverberg | 355/3 SH |
| 4,418,905 | 12/1983 | Garavuso | 271/98 |

Primary Examiner—Richard A. Schacher
Attorney, Agent, or Firm—William A. Henry, II

[57] ABSTRACT

In a system of plurally recirculating a set of document sheets for precollated copying wherein the document sheets are repeatedly individually fed seriatim from the bottom of an overlying stack thereof for copying with registration and returned to the top of the stack for restacking in a tray having a support surface, a rear guide and two edge guides, an improvement is disclosed that includes a straight ramp attached to one of the edge guides so that document sheets returned to the support surface will lie flat against the edge guide and thereby provide a positive registration position along the junction between the ramp and the rear guide thereby reducing the possibility of mis-registration due to bending of the document sheets during feeding and recirculation.

7 Claims, 5 Drawing Figures

AUTOMATIC RESTACKING REGISTRATION IN A RECIRCULATING DOCUMENT HANDLER

BACKGROUND OF THE INVENTION

The present invention relates to a document handling system and more particularly relates to an apparatus that automatically registers documents in a tray against a rear and a side registration surface of the tray. This apparatus is particularly suited for a recirculatory document (precollation copying) system in which documents are fed from the bottom of a stack.

It has become desirable to provide for automatic and accurate feeding and registration of individual original document sheets being copied, in order to utilize the higher speed copying capabilities of new copiers. However, one of the most important, and difficult to achieve, requirements for automatic handling is the accurate and reliable, but safe, registration of the original document at the proper position for copying. Conventionally, the document is desirably automatically either center registered or corner registered (depending on the copier) by the document handler at a pre-set registration position relative to the copier platen, with two orthogonal edges of the document aligned with two registration lines of the copier platen, i.e. with the original document aligned with the copier optics and copy sheet registration system. This registration accuracy is desirably consistently within less than 1 millimeter. If the document is not properly registered, then undesirable dark borders and/or edge shadow images may appear on the ensueing copy, or information near an edge of the document may be lost, i.e. not copied onto the copy sheets.

Document handling system in the past have been equipped with various document transports to move the original document sheets over the copier platen and into and out of registration. It is known in the art to register the original document for copying at the appropriate position relative to the transparent copying window in various ways. Typically, the document sheet is registered by driving it against a gate or stop at one edge of the platen. This may comprise projecting aligned fingers, or roller nips, or a single vertical surface, against which an edge of the sheet is driven into abutment. An important function of such registration is to also deskew the moving original document, i.e., to properly align it with the registration lines as well as to determine and control its registration position.

However, many such known recirculating document handlers drive a document onto the platen and register only the lead or trail edge of the document, without precisely side (laterally) registering the document. Any side registration of the document that occurs in such systems is performed prior to moving the document onto the platen, and is generally merely that provided by the edge side guides of the document tray, which must be set to accommodate the maximum lateral dimensions of the largest document systems, a system for also side registering or positioning the document after it is on the platen is used, i.e., positioning of the original on two axis with respect to the desired imaging position on the platen.

The use of top restacking and bottom feeding document recirculation aggravates the above-discussed problem of accurate registration of the document being fed. For example, with bottom sheet feeders, since the stack height and weight is variable, the normal force on the bottom sheet, (pressing the stack against the bottom sheet and pressing the bottom sheet against the stack tray) is also variable. Further, even if a document sheet is laterally re-registered as it is being restacked, the agitation of the stack by the bottom feeder, particularly if an air sheet separation system is used, may disturb the initial alignment of the sheet as the sheet works its way down from the top of the stack to the bottom before it is fed out again.

Because of variations in the sizes of documents of even the same standard size, it is often not possible to maintain lateral alignment by edge guides or even with edge joggers or tampers. Those sheets in the stack which are undersized can still vary in position by the difference in size between those smaller sheets and the larger sheets in the stack, since the edge guides and/or conventional side joggers are limited in setting by the widest sheets in the stack. Obviously, if edge guides were to be moved in, i.e., set for the smaller sheets, this would not allow flat stacking or settling or unobstructed feeding out of the larger sheets from between these edge guides. Thus, the side guides may have to be set apart by up to a several millimeters greater width than the width of the narrowest sheet in the stack, allowing a corresponding lateral misregistration of such narrower sheets. [As used herein, width or narrowness refers to the sheet dimension transverse its circulative feeding direction, regardless of whether the sheet is fed edgewise (long edge first) or lengthwise (short edge first). The former is more conventional].

Binding of the sheets between edge guides which are too close together, or even forcibly dragging the sheet against one edge guide, can cause wear or damage to the document edges, particularly for the multiple circulations used in precollation copying. Frictional rubbing of documents against only one edge guide, especially over the platen, can also cause skewing of the document as it is being fed. An edge guide on the platen itself has other disadvantages, e.g. potential "show around" printout of a line or shadow on the sides of the copy sheets, or loss of an edge image. Thus, platen edge guides are not generally used, or are withdrawn, in an automatic document feeder. Constant edge tampering or jogging is even worse, because it typically requires repeatedly forceably striking the edges of the stack, usually in only a small and constant area thereof, which can deform or otherwise damage these document edge areas, particularly over the extended time of repeated document recirculations. Older, and/or more brittle documents and extending oversize documents in a set are particularly vulnerable to this damage. In any case, as noted, such edge jogging cannot positively register all of the undersized documents in a set.

In contrast, with the disclosed system herein, each bottom sheet in the stack is individually, and gently, aligned directly against a defined reference lateral edge guide regardless of variations in size of the sheets in the stack, i.e. for a wide range of sheet widths, and without any interference of feeding or larger sheets. The sheets are not aligned by hitting their edges. Rather, they are allowed to fall due to gravity against an inclined registration edge. By using a recirculating document handler (RDH) which minimizes document sheet skewing in the feeding system from the document set stack to the registration position on the platen no other lateral registration system is needed for the entire RDH system. Thus, there is no significant edge guide drag on the documents.

Further details of an exemplary recirculating document handler with which the present invention may be utilized, including relevant teachings of such features as disclosed in FIG. 1 herein, are disclosed in U.S. Pat. No. 4,418,905 which is incorporated herein by reference to the extent necessary to practice the present invention.

A preferred specific feature of the present invention is to provide a recirculating document handling apparatus that includes the combination of less rear corner restriction and straight ramp tray configuration that automatically registers documents against a rear registration surface, especially during restack, bends documents in only one direction during feeder acquisition, and feeds documents in a straight line. In combination, this system eliminates side registration over the platen and side stack jogging during restack of documents.

Further features and advantages of the invention will be better understood by reference to the following description, and to the drawings forming a part thereof.

The invention will now be described by reference to a preferred embodiment of the present invention.

DESCRIPTION OF THE PREFERRED EMBODIMENT

Figure 1:
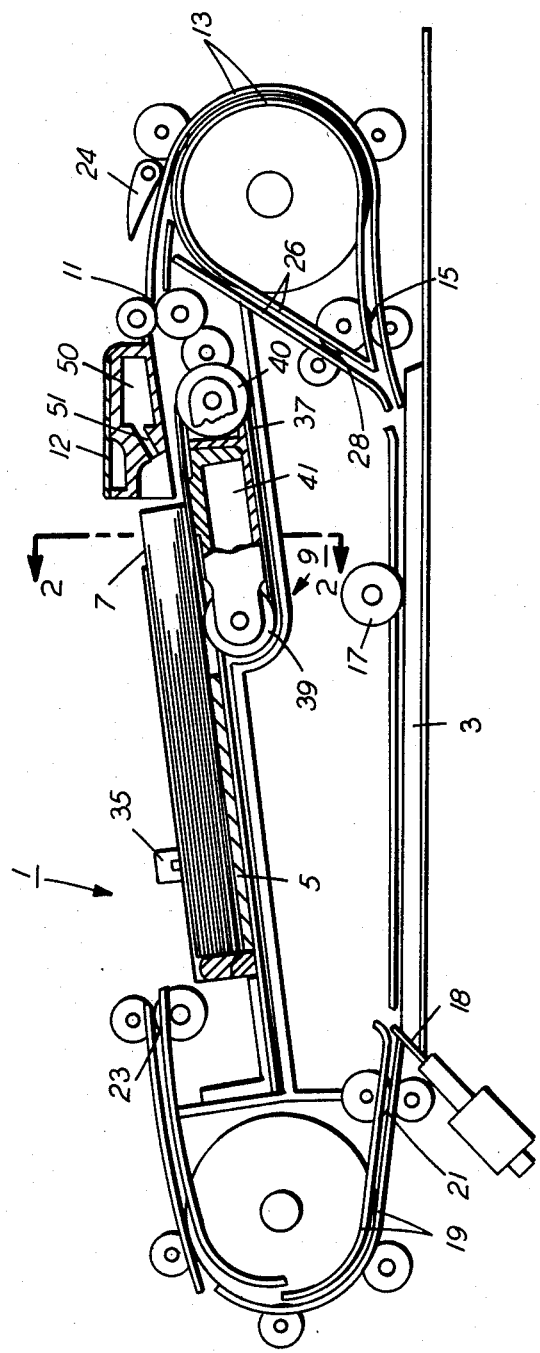
FIG. 1 is a cross-sectional side view of an exemplary recirculating document handler employing the automatic registration system of the present invention.

Referring particularly to FIG. 1, there is illustrated an exemplary automatic sheet separator feeder incorporating the present invention for installation over the exposure platen 3 of a conventional xerographic reproduction machine. This is merely one example of a document handler with which the automatic registration system of the present invention may be combined. The document handler 1 is provided with a document tray 5 adapted for supporting a stacked set of documents 7. A vacuum belt corrugating feeder mechanism 9 is located below the front or forward area of the document tray for acquiring and corrugating the bottom document sheet in the stack and for feeding out that document sheet to take-away roll pair 11 through document guides 13 to a feed-roll pair 15 and under platen roll 17 onto the platen of the copy machine for reproduction. A rectractable registration edge 18 is provided here to register the lead edge of the document fed onto the platen. Following exposure of the document, the edge 18 is retracted by suitable means such as a solenoid and the document is fed off the platen by roll 17 onto guide 19 and feed-roll pair 21 and returned back to the top of the document stack 7 through a feed-roll pair 23. Restacking lateral realignment is provided by an edge guide 62 (see FIG. 2) spaced from an opposing fixed edge guide 64. Inclined surfaces 63 and 65 in conjunction with flat surface 67 help settle incoming (restacking) sheets between the two guides 62 and 64. A resettable edge guide could be provided adjacent side guide 64 if desired in order to adjust tray 60 to handle any size documents if desired.

In the event it is desired to present the opposite side of a document for exposure, the document is fed from the stack 7 through guides 13 until the trail edge passes document diverter 24. Document diverter 24 is then rotated counterclockwise, i.e. into the document sheet path. The document direction is reversed and the document is diverted by diverter 24 through guides 26 and feed-roll pair 28 onto the platen 3.

The document handler 1 is also provided with a sheet separator finger 35, as is well known in the art, to sense and indicate the documents to be fed versus those documents returned to the document handler, i.e. to count each set circulated. Upon removal (feed out) of the last document from beneath sheet separator finger 35, the finger 35 drops through a slot provided in the tray 5 to actuate a suitable sensor indicating that the last document in the set has been removed from the tray. The finger 35 is then automatically rotated in a clockwise direction or otherwise lifted to again come to rest on top of all the documents in the stack 7, for the start of the next circulation of document set 7.

Figure 2:
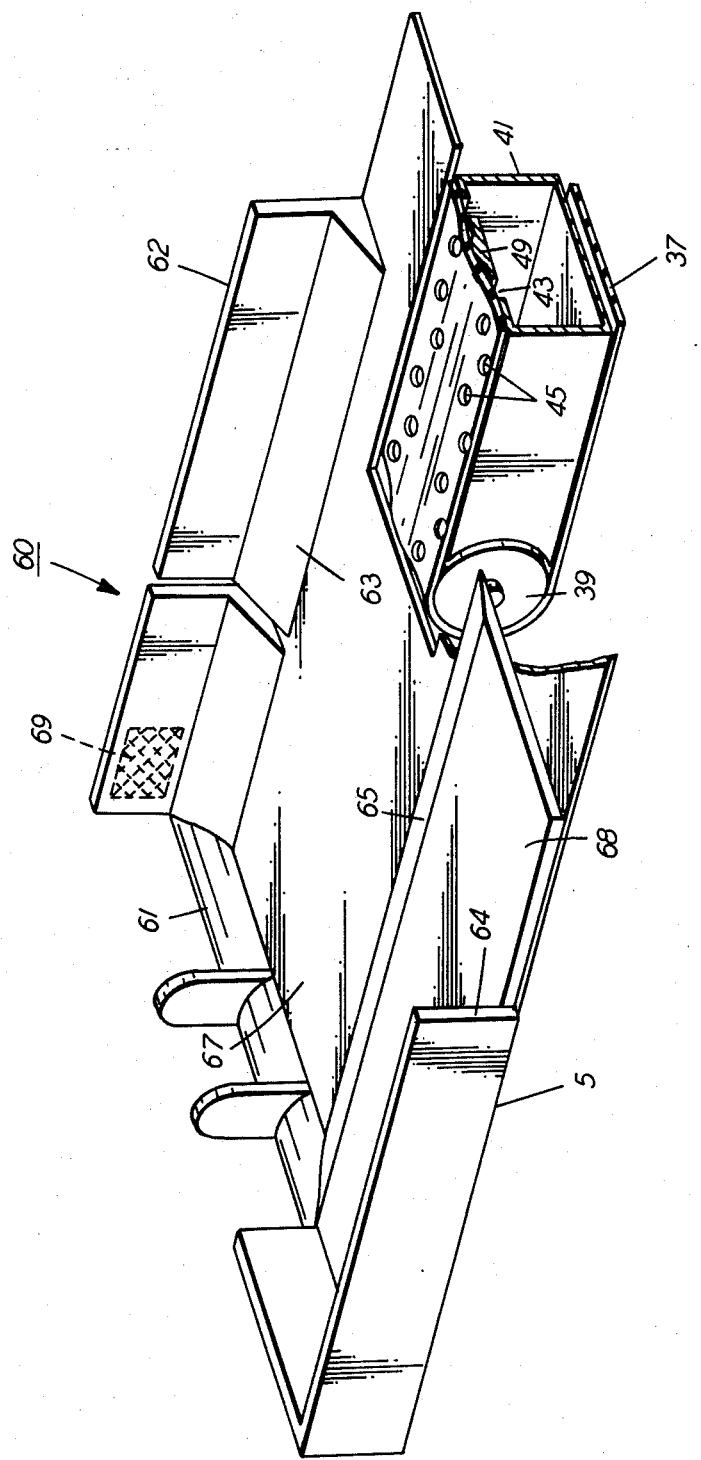
FIG. 2 is an enlarged partial isometric view of FIG. 1 taken along lines 2—2.
Figure 3:
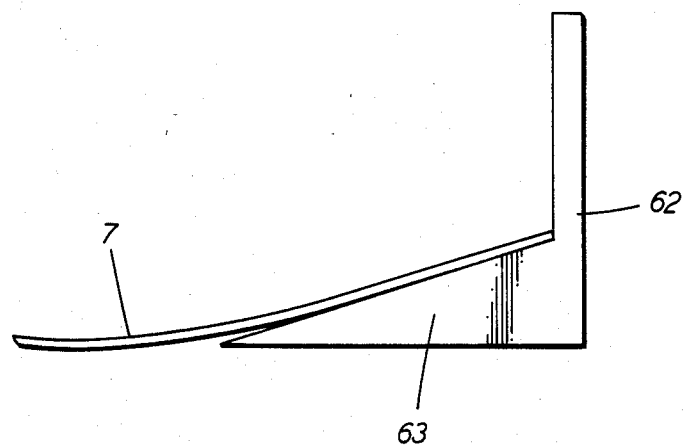
FIG. 3 is an enlarged partial cross-sectional end view of the straight ramp tray configuration in accordance with the present invention.

Referring more particularly to FIGS. 1, 2 and 3 and the document sheet separator-feeder 9, disclosed is a feed belt 37 supported for movement on feed belt rolls 39 and 40. Spaced within the run of the belt 37 there is provided a vacuum plenum 41 having openings 43 therein adapted for cooperation with perforations 45 in the belt 37 to provide a vacuum for pulling the bottom document in the document stack onto the belt 37. The plenum 41 is provided with a raised portion 49, beneath the center belt 37 so that upon capture of the bottom document in the stack against belt 37, a center corrugation will be produced in the bottom sheet. This raised portion may project above the plane of the remainder of the belt by approximately 2 millimeters. Thus the document is corrugated into a double valley configuration parallel to the direction in which it is fed. The flat surfaces of the vacuum belt 37 on each side of the raised center of the belt generates a region of stress on the document which varies with the document beam strength. In the unlikely event that more than one document is pulled down into contact with the vacuum feed belt, the beam strength of the second (overlying) document resists this corrugating action. Thus, gaps are opened between the first and second sheets, which gaps extend to the sheet lead edges. These gaps or channels reduce the vacuum pressure levels between these sheets due to porosity in the first (bottom) sheet and provide for entry of the separating air flow from the air knife 12. Air knife 12 is preferably of the type employing a laterally converging stream as disclosed in U.S. Pat. No. 4,418,905 which has been incorporated herein by reference.

In operation, the air knife injects air between the bottommost document pulled down against the feed belt and the documents in the stack thereabove to provide an air cushion or bearing between the stack and the bottom document to minimize the force needed for removing the bottom document from the stack. With the use of this air knife in conjunction with the above described bottom sheet corrugator, even if two documents are pulled down toward the belt 37, since the top sheet would not be corrugated, the air knife would inject air into the space between the two documents and force the second document off from the raised belt back toward the document stack.

As can be seen by reference to FIG. 1, the stack tray is designed such that the lead edge of the documents in the stack are spaced a slight distance from the front edge of the tray. Further, the air knife is canted such that the air from knife 12 is discharged at an angle to the plane of the surface of the belt 37. With this disclosed interrelationship between the vacuum feed belt, the lead edge of the stack of documents, and the air knife location and angular orientation, the document feeder is capable of reliably separating and feeding individual document sheets even if the documents have some upcurl.

By suitable valving and controls, it is also desirable to provide a delay between the time the vacuum is applied to pull the document onto the feed belts and the start up of the feed belts, to assure that the bottom document is captured on the belts before belt movement commences and to allow time for the air knife to separate the bottom sheet from any sheets that were pulled down with it.

To further increase the efficiency of the system, the stack tray is provided with a rearward tilt as shown in FIG. 1. When flotation air is provided under the stack or between the first and second sheets, gravity will allow the sheets to settle or float back against rear tray wall 61. Thus, the sheet being removed is pulled uphill while gravity helps hold the remainder of the sheets back, helping to prevent multifeeds, and providing alignment or initial end registration of the stack 7 on one axis (in the feeding direction).

Figure 5:
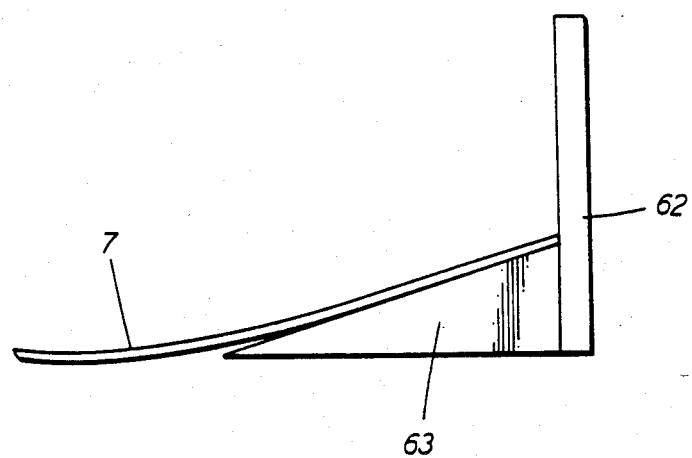
FIG. 5 is an enlarged partial cross-sectional view end view of an alternative embodiment of the straight ramp tray configuration in accordance with the present invention that shows a side guide and ramp member as two separate and individual parts.

In particular reference to FIG. 2, and in accordance with the present invention improvements for automatically edge registering documents in tray 60 is shown that insures non-skewed feeding of documents in the high performance recirculating document handler 1. The improvements among other things include straight ramps 63 and 65 attached to side wall or guide 62 and raised support surface 68 respectively. The ramps are slightly inclined to an appropriate degree. Also, corner restrictions from a portion of end wall 61 are removed to allow free flow of air in a non-concentric manner which favors the rear corner of the tray. With these features in the tray, documents are aligned along the side of side guide 62 by airflow from air knife 12 only, i.e., no additional lateral registration means is necessary. As shown in FIG. 5, straight ramp 63 and side guide 62 could be separate and individual members attached to each other by conventional means if desired.

Airflow from the air knife 12 automatically moves the documents toward the registration corner 61, 62 for alignment. The straight ramp 63 as shown in FIG. 3 allows the document 7 to lie flat against side guide 62 and provides a positive registration position along the junction between the ramp and the rear guide or wall surface 61 thus reducing the possibility of misregistration due to bending of the documents if curved ramps were used. With curved rails, document registration varies depending upon the stiffness of the document. Additional airflow can be made available if required by removing material 69 from the rear portion of side guide 62 as shown. Raised support surface 68 together with slanted ramp 65 and lower support surface 67 serve to force documents into registration corner junction 61, 62 and against side guide 62 and slanted ramp 63, and thereby provide a further position influence on document lateral registration in a straight line along side guide 62.

With the lateral and side registration system disclosed herein, no separate lateral registration means is required. That is, with a low skew document feeder, as disclosed herein, no lateral re-registration is required over the platen or anywhere else in the entire document recirculation system.

Figure 4:
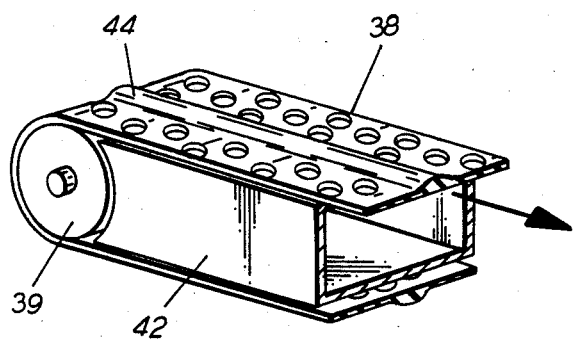
FIG. 4 is an enlarged partial isometric view of an alternative feed belt usable in the recirculating document handler shown in FIG. 1.

As an alternative, a vacuum plenum and feed belt configuration shown as 42 and 38 respectively in FIG. 4 could be employed as the vacuum belt corrugation feeder mechanism 9 if desired to provide corrugation in documents 7 as they are fed. Belt 38 and vacuum plenum 42 have holes therein that facilitate the attachment of documents to the belt. A centerline raised surface or ridge is positioned on belt 38 in order for corrugation of the documents to be accomplished.

It should now be apparent that a recirculating document handler has been disclosed having an airflow assisted document restack tray which includes bottom, side and rear confining surfaces and wherein the bottom surface comprises a substantially horizontal surface spaced between two inclined surfaces at least one of which abuts a side surface to which the documents are to be registered and wherein the rear surface comprises a rear dam which defines an airflow exit path that enhances a corner registration of the documents.

While the recirculative document sheet lateral edge registration and feeding system disclosed herein is preferred, it will be appreciated that various other alternatives, modifications, variations or improvements thereon may be made by those skilled in the art, and the following claims are intended to encompass all of those falling within the true spirit and scope of the invention.

What we claim is:

1. In a recirculating document handling apparatus for repeatedly recirculating a set of document sheets for precollation copying, wherein the document sheets are repeatedly individually fed seriatim from the bottom of a stack thereof for copying in a precise registration position on two axis of a copier platen, in the direction of document movement and laterally thereof, and returned to the top of the stack supported by a support surface, and restacked between two elongated side guides and abut a rear guide connected to said support surface, said side guides and said rear guide including cutaway portions to allow the escape of air from an air knife during said restacking of said document sheets, said side guides being laterally spaced by a greater distance than the lateral dimension of said document sheets to allow unrestricted restacking therebetween with variations in document dimensions, and one of side guides being stationarily aligned with said lateral registration position on said platen but spaced therefrom, the improvement of automatic edge registration of said document sheets on said support surface comprising:

ramp means attached to at least one of said elongated side guides and said support surface, said ramp means including an inclined straight surface portion such that it forms an acute angle with respect to said at least one of said elongated side guides and said support surface and adapted to allow said document sheets being returned to said support surface to lie flat against said inclined straight surface portion so as to provide a positive registration position along the junction between said ramp means and said rear guide thereby reducing the possibility of mis-registration due to bending of the documents during feeding and recirculation.

2. The apparatus of claim 1, wherein said support surface includes an inclined straight ramp means that is positioned on said support surface and removed from the other of said elongated side guides.

3. The apparatus of claim 2, wherein said other of said elongated side guides is substantially less in length than said one of said elongated side guides in order to allow easy insertion and removal of said document sheets from said support surface.

4. The apparatus of claim 3, including a feed belt means having an endless raised ridge along the center thereof for corrugating document sheets as they are fed by said feed belt means.

5. The apparatus of claim 1, wherein said ramp means and said one of said elongated guides are integrally formed.

6. In a recirculating document handling apparatus for repeatedly recirculating a set of document sheets from precollation copying, wherein the document sheets are repeatedly individually fed seriatim from the bottom of a stack thereof for copying a precise registration position on two axis of a copier platen, in the direction of document movement and laterally thereof, and returned to the top of the stack supported by a support surface, and restacked between two elongated side guides and abut a rear guide connected to said support surface, said rear guide including cutaway portions to allow the escape of air from an air knife during said restacking of said document sheets, the improvement of automatic edge registration of said document sheets on said support surface, comprising:

ramp means attached to at least one of said elongated side guides and extending over a major portion of the length of said at least one of said elongated side guides, said ramp means including an inclined straight surface portion that forms an acute angle with respect to said at least one of said elongated side guides and said support surface and adapted to allow said document sheets being returned to said support surface to lie flat against said inclined straight surface portion so as to provide a positive registration position along the junction between said ramp means and said rear guide thereby reducing the possibility of mis-registration due to bending of the documents during feeding and recirculation.

7. The apparatus of claim 6, wherein said support surface includes a portion inclined thereto, and extending over a major portion of the length of said support surface.

* * * * *